United States Patent
Chesnutt et al.

(10) Patent No.: US 9,392,452 B2
(45) Date of Patent: Jul. 12, 2016

(54) PROCESSING ELECTRONIC MESSAGES WIRELESSLY SENT TO A VEHICLE

(75) Inventors: Elizabeth Chesnutt, Troy, MI (US); Sethu K. Madhavan, Canton, MI (US); Ki Hak Yi, Windsor (CA)

(73) Assignee: General Motors LLC, Detroit, MI (US)

( * ) Notice: Subject to any disclaimer, the term of this patent is extended or adjusted under 35 U.S.C. 154(b) by 567 days.

(21) Appl. No.: 11/964,240

(22) Filed: Dec. 26, 2007

(65) Prior Publication Data

US 2009/0172102 A1 Jul. 2, 2009

(51) Int. Cl.
*G06F 15/16* (2006.01)
*H04W 12/06* (2009.01)
*H04L 12/58* (2006.01)
*H04W 4/12* (2009.01)

(52) U.S. Cl.
CPC .......... *H04W 12/06* (2013.01); *H04L 12/585* (2013.01); *H04L 51/12* (2013.01); *H04L 12/5855* (2013.01); *H04W 4/12* (2013.01)

(58) Field of Classification Search
CPC ..... H04L 29/06; H04L 12/581; H04L 12/585; H05L 12/58; G06Q 10/107
USPC ................. 709/206, 205, 203, 201
See application file for complete search history.

(56) References Cited

U.S. PATENT DOCUMENTS

| | | | |
|---|---|---|---|
| 5,513,244 A | 4/1996 | Joao et al. | |
| 5,917,405 A | 6/1999 | Joao | |
| 6,101,393 A * | 8/2000 | Alperovich | H04M 3/533 370/278 |
| 6,108,559 A * | 8/2000 | Åström et al. | 455/466 |
| 6,339,736 B1 * | 1/2002 | Moskowitz et al. | 701/32.7 |
| 6,542,076 B1 | 4/2003 | Joao | |
| 6,549,130 B1 | 4/2003 | Joao | |
| 6,587,046 B2 | 7/2003 | Joao | |
| 7,277,010 B2 | 10/2007 | Joao | |
| 7,397,363 B2 | 7/2008 | Joao | |
| 2005/0039019 A1 | 2/2005 | Delany | |
| 2005/0048998 A1 | 3/2005 | Zhu | |
| 2005/0170854 A1 * | 8/2005 | Benco et al. | 455/461 |
| 2006/0071644 A1 | 4/2006 | Nerheim | |
| 2006/0258379 A1 * | 11/2006 | Oesterling | G07C 5/008 455/466 |

(Continued)

FOREIGN PATENT DOCUMENTS

| | | |
|---|---|---|
| CN | 1859613 | 11/2006 |
| CN | 1863336 | 11/2006 |
| EP | 1408705 | 4/2004 |

OTHER PUBLICATIONS

Office Action for German application No. 10 2008 062 545.0, dated Aug. 9, 2010, 3 pages.

*Primary Examiner* — Abdelnabi Musa
(74) *Attorney, Agent, or Firm* — Christopher DeVries; Reising Ethington P.C.

(57) ABSTRACT

A processing system and method for controlling the distribution of certain types of electronic messages, such as SMS messages, instant messages, emails, etc., that are wirelessly sent to a vehicle. In one embodiment, a messaging application installed on a communication device diverts to a call center outgoing messages destined for the vehicle. Once the electronic message is properly checked and authenticated at the call center, it is wirelessly forwarded on to the vehicle where its contents can be displayed to the passengers. By controlling the distribution of these types of electronic messages to the vehicle, the processing method can reduce or mitigate the effects of unauthorized third party communications.

26 Claims, 2 Drawing Sheets

(56) References Cited

U.S. PATENT DOCUMENTS

| | | |
|---|---|---|
| 2006/0268916 A1 | 11/2006 | Sarkar |
| 2006/0284614 A1 | 12/2006 | Kim et al. |
| 2007/0021914 A1* | 1/2007 | Song .................. 701/213 |
| 2007/0022177 A1* | 1/2007 | Kwon .................. 709/217 |
| 2007/0029982 A1 | 2/2007 | Chen |
| 2007/0152626 A1 | 7/2007 | Boebel |
| 2007/0160198 A1* | 7/2007 | Orsini et al. .................. 380/28 |
| 2007/0260751 A1* | 11/2007 | Meesseman .................. 709/248 |
| 2008/0036586 A1* | 2/2008 | Ohki .................. G01C 21/362 340/539.13 |
| 2008/0045274 A1* | 2/2008 | Witkowski et al. ........ 455/569.2 |
| 2009/0047929 A1* | 2/2009 | Chesnutt et al. ............. 455/411 |

* cited by examiner

PROCESSING ELECTRONIC MESSAGES WIRELESSLY SENT TO A VEHICLE

TECHNICAL FIELD

The present invention generally relates to methods of processing communications and, more particularly, to methods of processing electronic messages wirelessly sent to a vehicle.

BACKGROUND

Numerous types of wireless communication devices are used throughout the world each day, including devices such as mobile phones, pagers, personal digital assistants (PDAs), and vehicle communication devices. Many of these devices use one or more types of communication channels, including voice and data channels, to provide a variety of services over wireless networks. Some devices utilize data encoding techniques to communicate both voice and data information over a voice channel, while other devices must use a data channel to send data information.

Despite much effort to employ security features in wireless messaging systems, a fair amount of unsolicited third party communication still occurs. For instance, third party communications include spam, unsolicited advertisements, malware (malicious software), or communications that are part of a coordinated attack on the system, to name but a few. Some examples of malware include computer viruses, worms, trojan horses, spyware, dishonest adware, and other nefarious and unwanted software.

SUMMARY OF THE INVENTION

According to one aspect, there is provided a method for processing electronic messages sent to a vehicle. The method comprises the steps of: (a) identifying at least one communication device authorized to send electronic messages to the vehicle; (b) providing a messaging application to the communication device; (c) sending an electronic message from the communication device to a call center, wherein the electronic message is intended for the vehicle but is diverted to the call center by the messaging application; and (d) if the communication device is properly authorized to send electronic messages to the vehicle, then forwarding the electronic message from the call center to the vehicle.

According to another aspect, there is provided a method for processing electronic messages sent to a vehicle. This method comprises the steps of: (a) sending an electronic message from a communication device to a call center, wherein the electronic message is intended for the vehicle but is routed to the call center by a messaging application installed on the communication device; (b) analyzing the electronic message sent from the communication device to determine if the communication device is properly authorized to send electronic messages to the vehicle; (c) if the communication device is properly authorized to send electronic messages to the vehicle, then forwarding the electronic message from the call center to the vehicle; and (d) displaying contents of the electronic message to passengers in the vehicle via a visual display.

According to yet another aspect, a method for processing electronic messages sent to a vehicle. This method comprises the steps of: (a) determining an authorized messaging group that includes one or more communication devices authorized to send SMS messages to the vehicle; (b) providing a messaging application to a communication device in the authorized messaging group; (c) updating records maintained at a call center with information regarding the authorized messaging group; (d) diverting a first SMS message from the communication device to the call center, wherein the SMS message is intended for the vehicle and is diverted by the messaging application; (e) analyzing the first SMS message at the call center to determine if the communication device is part of the authorized messaging group; (f) if the communication device is part of the authorized messaging group, then wirelessly sending a second SMS message from the call center to the vehicle; (g) analyzing the second SMS message at the vehicle to determine if it is authentic; and (h) if the second SMS message is authentic, then displaying contents of the second SMS message to passengers in the vehicle.

In another aspect of the invention, there is provided a system for processing electronic messages sent to a vehicle. The system includes a communication device, call center, and a plurality of vehicles. The communications device can be a mobile phone or other device that has text messaging capability such that the communication device receives user inputted text messages and sends the text messages to an addressee selected by the user. The vehicles each have a telematics unit that wireless receives text messages, and the call center communicates wirelessly with the plurality of vehicles via their telematics units. The communication device includes a messaging application that detects the addressee selected by the user and, if the addressee corresponds to one of the plurality of vehicles, the messaging application redirects the text message to the call center. The call center then receives the redirected text message, attempts to authenticate the redirected text message and, if authenticated, sends the redirected text message to the corresponding vehicle via its telematics unit.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The processing method described herein is generally designed to control the distribution of certain types of electronic messages, such as short message service (SMS) messages, instant messages, emails, etc., that are wirelessly sent to a vehicle. By controlling the distribution of these types of electronic messages, the processing method can reduce or mitigate the effects of unauthorized third party communications, such as those mentioned above.

Communications System—

Figure 1:
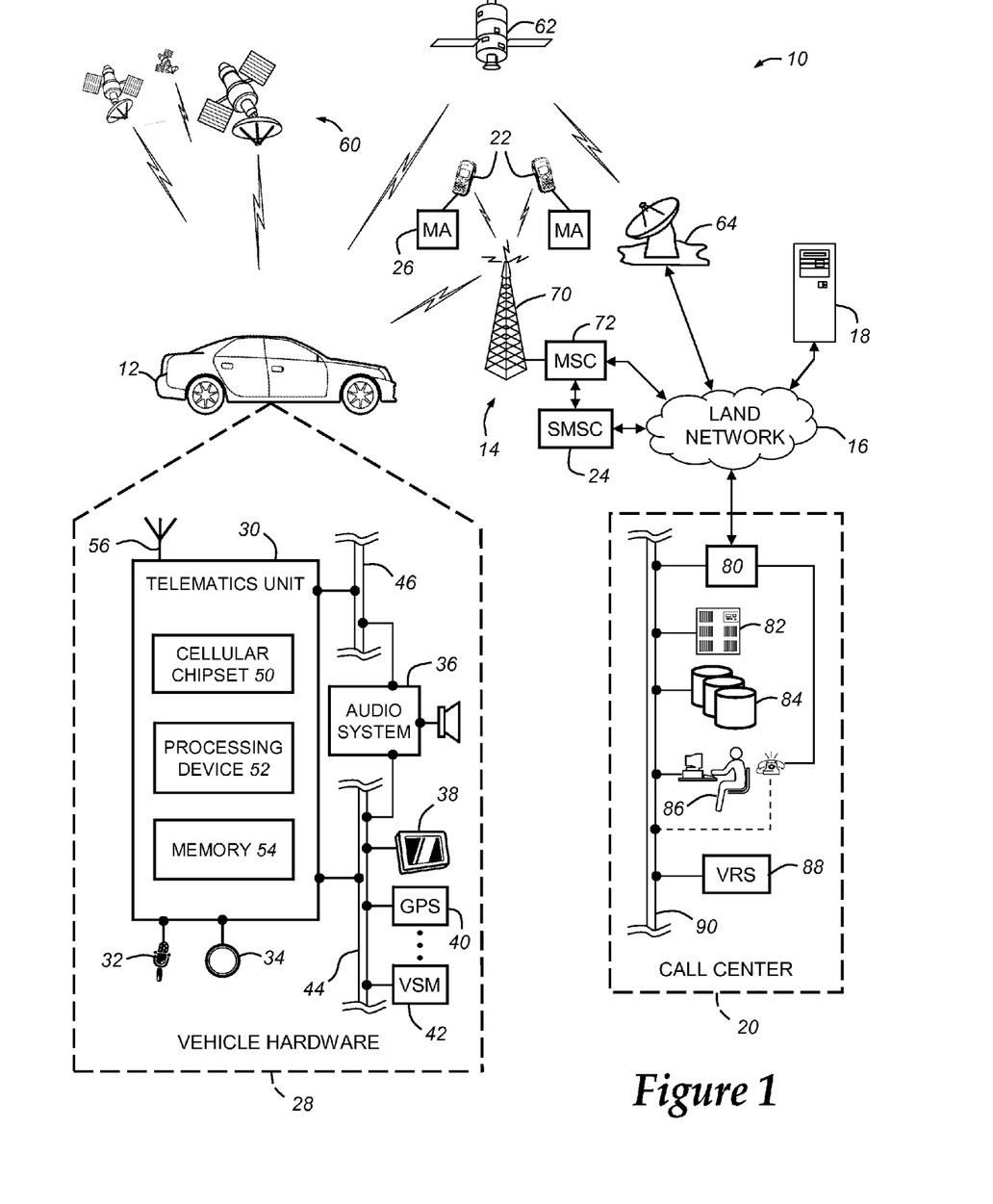
FIG. 1 is a block diagram depicting an exemplary embodiment of a communications system that is capable of utilizing the processing method disclosed herein.

With reference to FIG. 1, there is shown an exemplary operating environment that comprises a mobile vehicle communications system 10 and that can be used to implement the processing method disclosed herein. Communications system 10 generally includes a vehicle 12, one or more wireless carrier systems 14, a land communications network 16, a computer 18, a call center 20, and one or more communication devices 22. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the communications channel. By providing both voice and data communication, telematics unit 30 enables the vehicle to offer a number of different services including those related to messaging, navigation, telephony, emergency assistance, diagnostics, infotainment, etc. Data can be sent over a data connection, such as via packet data transmission over a data channel, or via a voice channel using techniques known in the art. For combined services that involve both voice communication (e.g., with a live advisor or voice response unit at the call center 20) and data communication (e.g., to provide certain messaging features), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switch data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the processing method discussed herein.

Telematics unit 30 can be used to provide a diverse range of vehicle services that involve wireless communication to and/or from the vehicle. Such services include: messaging with external communication devices; turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the exemplary telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs)

42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions, including the display of messages sent to the vehicle. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Wireless carrier system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Communication devices 22 include any device that can be used to send electronic messages, such as SMS messages, instant messages, and/or emails, to vehicle 12. This includes devices that conduct manual and/or automated messaging operations, and those that connect to vehicle 12 through wireless carrier system 14 and/or land network 16. Some examples of suitable communication devices include mobile phones, personal digital assistants (PDAs), computers, and other telematics-equipped vehicles. According to the embodiment shown here, communication devices like mobile phones and wireless-enabled PDAs directly access wireless carrier system 14 when messaging with vehicle 12, while other communication devices access the wireless carrier system by going through the land network. Each communication device 22 that is used within the system can have a messaging application (MA) 24 installed on the device, as will be described below in greater detail.

Short message service center (SMSC) 24 is preferably in communication with wireless carrier system 14 and/or land network 16 and is involved in the communication of SMS messages. SMSC 24 can operate according to a store-and-forward principal; that is, when a first user sends an SMS message that is intended for a second user, the SMS message gets stored at the SMSC until the second user is available to receive it. In other embodiments, the SMSC employs a store-and-forget approach where it only attempts to pass the SMS message along one time. These types of approaches enable users to send and receive SMS messages at any time, even if they are currently on a voice call. It should of course be appreciated that the exemplary representation of SMSC 24 is but one example of a suitable arrangement, as the SMSC could instead be provided according to some other configuration known in the art. For instance, SMSC 24 could be integrated within wireless carrier system 14 and/or land network 16, instead of being schematically shown as a separate stand-alone component. Also, it is to be understood that multiple SMSCs may be utilized.

Processing Method—

Figure 2:
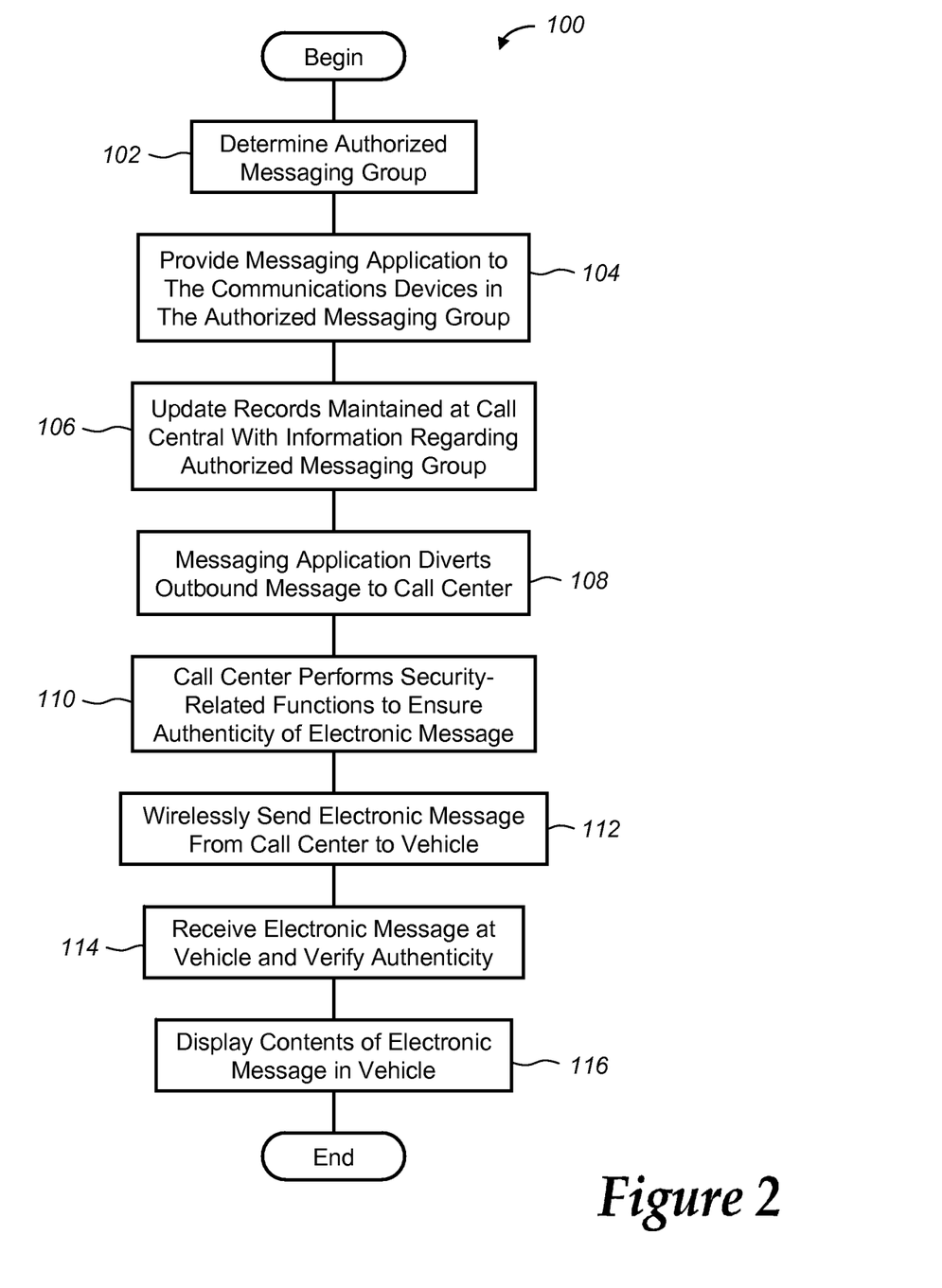
FIG. 2 is a flowchart illustrating some of the steps of an exemplary embodiment of the processing method.

The processing method described herein is generally designed to oversee or control the flow of electronic messages wirelessly sent to a vehicle. Turning now to FIG. 2, there is shown a flowchart that illustrates some of the steps of an exemplary embodiment 100 of such a method. According to this embodiment, step 102 determines or identifies an "authorized messaging group," which includes one or more communication devices 22 that have been granted access to send electronic messages to a particular vehicle 12. The authorized messaging group can be determined according to a variety of techniques. For example, if vehicle 12, its owner, or the account subscriber are enrolled in some type of pre-selected calling plan, such as a family calling plan, then any communication devices 22 associated with that calling plan are automatically added to the authorized messaging group. In a different embodiment, the vehicle owner, account subscriber, or some other user specifically designates the communication devices 22 to which they wish to grant messaging access. They could do this by using computer 18 to enter one or more contact numbers for each of the selected communication devices into an affiliated website, by providing the contact numbers to call center 20, or by inputting the contact numbers into the vehicle hardware 28 for subsequent transmission to the call center, to name but a few examples. Once step 102 is performed, the processing method should be aware of which communication devices 22 are authorized to wirelessly send electronic messages to vehicle 12.

In step 104, each of the communication devices 22 in the authorized messaging group is provided with a messaging application 24, which is generally a software program that is designed to run on the communication device and facilitates messaging with vehicle 12. In the example where communication device 22 is a mobile phone, the messaging application 24 can be developed with the assistance of application development tools and platforms such as the Binary Runtime Environment for Wireless (BREW), Java Micro Edition (Java-ME), Android, or others known to those skilled in the art. Other messaging applications, including ones built to run on PDAs, computers and communication devices other than mobile phones, can also be employed. This step could have an optional feature that first checks to see if communication device 22 is already equipped with the messaging application so that redundant downloads, etc. can be avoided. In addition to the wide variety of messaging applications that can be used, there are a number of potential methods for deploying or making available the messaging application to communication devices 22.

For instance, call center 20 can send out an invitation to each communication device 22 in the authorized messaging group to download the messaging application 24. The messaging application can be provided for direct download to communication device 22 or for indirect download where it is first downloaded to a computer or some other device and subsequently transferred to the communication device. Alternatively, the messaging application or certain components thereof can be attached to an email or other communication and sent to the communication devices in the authorized messaging group. Again, the preceding techniques are not an exhaustive list, as other methods and techniques for distributing or providing the messaging application to communication devices 22 could also be used. It is also possible for step 104 to utilize different deployment methods for different members of the authorized messaging group; for example, sending a download invitation to a first member of the authorized messaging group and emailing the messaging application to a second member. Following installation of the messaging application 24, communication device 22 may send a "registration notice" or some other confirmation back to call center 20.

In step 106, call center 20 updates internal records maintained in files, databases, and other electronic data structures with current information regarding the status of the authorized messaging group. For example, if ten different communication devices 22 are selected to be part of the authorized messaging group and eight of the ten devices download the messaging application 24, then call center 20 may record this information in a profile or other record stored in call center database 84. This information can be integrated into a larger profile for vehicle 12 or it can be maintained as a separate data component, to cite but two examples. It should be pointed out that step 106 does not have to be performed sequentially and separately, with respect to steps 102 and 104, as call center 20 could update its records when the authorized messaging group is first determined, when the messaging application is provided to communication devices 22, or at some other time. At this point, the processing method is ready to process an outgoing message sent from one of the communication devices.

When a user of one of the communication devices 22 sends a message destined for vehicle 12, the messaging application diverts, or redirects, the outbound message so that it is first sent to call center 20 or some other message processing destination, step 108. The diversion of the electronic message can be performed with or without the user's knowledge, depending on the particular setup. In one embodiment, the user of communication device 22 actually initiates or begins running the messaging application in order to compose the message. That is, the messaging application provides the user interface for composing and sending the message. In a different embodiment, the messaging application is running in the background of communication device 22 and cooperates with a separate messaging program, such as a previously-installed text messaging program that might have come as an OEM-installed component from the manufacturer. In this latter embodiment, the messaging application 24 would monitor the addressee selected by the user and intercept those messages that are destined for vehicle 12 and redirect them to the call center 20. One of a number of different electronic message types can be sent in step 108, including SMS messages, instant messages, emails, etc. By diverting or routing electronic messages to call center 20 or some other pre-selected designation before sending them to vehicle 12, the processing method is able to perform a variety of security functions that can prevent or reduce the effects of unauthorized third party messages. Also, it can be helpful, from a security perspective, having call center 20 act as the only messaging gateway to vehicle 12.

According to an optional feature, the messaging application could check to see which type of messaging format is most efficient and/or economical before diverting the electronic message in step 108. For example, if a short email is composed that could be provided in an SMS message and communication device 22 is enrolled in a calling plan with unlimited SMS messages, then the messaging application 24 could convert the initial email into an SMS message before routing it to call center 20. Similarly, the messaging application could check the status of various network resources before routing messages in step 108. If there was a problem with SMSC 24, for example, then an electronic message initially composed as an SMS message could automatically be converted into an email or some other message type. These are only some of the possibilities, as the messaging application can certainly consider other factors when determining which type of message should be sent to call center 20.

Once the electronic message arrives at call center 20, step 110 performs a variety of security-related functions in order to ensure the authenticity of the electronic message. In one embodiment, step 110 checks records that are maintained at call center 20 and associated with vehicle 12 to determine if the communication device that sent the electronic message is properly authorized to send messages to that particular vehicle. In other words, is communication device 22 part of the authorized messaging group for vehicle 12. This type of check can be performed by comparing the contact numbers saved in the records against the contact number of the communication device currently sending the message, or it can be performed according to other, more sophisticated techniques known in the art. To facilitate the process, the messaging application 24 can include contact numbers and other pertinent pieces of data in a header or other section of the electronic message for easy extraction and analysis by call center 20.

In addition to determining whether or not communication device 22 is part of the authorized messaging group, call center 20 can employ a variety of other security features before forwarding the electronic message to vehicle 12. For instance, call center 20 can encrypt the contents of the electronic message and then send them as unreadable cipher text; thus, making it more difficult for a third party to intercept and interpret the message. A secret key, which is preferably saved at call center 20 and vehicle 12, is used to decrypt the electronic message at the vehicle. Examples of encryption techniques that could be used are disclosed in U.S. patent application Ser. No. 11/837,775 entitled Method of Authenticating a Short Message Service (SMS) message, which is assigned to the present assignee and is incorporated herein by reference. In one of the embodiments of that application, a hash function and secret key are used to produce a digest that is included in the payload section of an SMS message, which is then decrypted and authenticated at the vehicle.

If step 110 determines that the electronic message is fit for transmission to the vehicle, then step 112 forwards the electronic message from call center 20 to vehicle 12 via wireless carrier system 14. As before, the electronic message that is wirelessly sent from call center 20 can be configured as one of a number of different message types including, but not limited to, SMS messages, instant messages, and emails. In one embodiment, step 110 converts the electronic message that was diverted from communication device 22 into a different message type before forwarding it to vehicle 12. For example, communication device 22 could transmit an SMS message, the SMS message could be diverted or routed to call center 20, and the SMS message could be converted into an email or other message of packet data format before sending it to vehicle 12. Of course, the diverted electronic message from communication device 22 could simply be forwarded on to vehicle 12 with little or no modification to the message. Thus, "forwarding" broadly includes sending the diverted message to the vehicle unchanged, adding content such as encryption and other security features to the diverted message before sending it to the vehicle, removing content from the diverted message before sending it to the vehicle, changing the message type of the diverted message before sending it to the vehicle, or processing the diverted message from the communication device according to some other method known in the art before sending it to the vehicle.

If, on the other hand, step 110 determines that the electronic message is not fit for transmission to vehicle 12, then the processing method can simply disregard the message, store it for subsequent analysis and reference, or send a response to the device from which it came indicating that it won't be sent to the vehicle, to cite but a few examples. One instance where step 110 may elect to not forward the electronic message on to the vehicle is if the originating communication device is not part of the authorized messaging group for that vehicle.

In step 114, vehicle 12 receives the electronic message from call center 20 and performs one or more security checks to verify the message's authenticity. Software maintained at the vehicle could be designed to accept any electronic message originating from call center 20, as it knows that the call center only sends valid messages. If the electronic message were encrypted, as described above, then software maintained at vehicle 12 would utilize the same secret key to decrypt and display the contents of the electronic message to the vehicle passengers. The encryption/decryption precautions can be in addition to or in lieu of checking the origination address of the electronic message to ensure that it is in fact from call center 20. Those skilled in the art will appreciated that these are only some of the possible security steps and techniques that could be used to authenticate the incoming electronic message, as others are certainly possible.

If the electronic message is deemed to be authentic—e.g., sent from the call center and properly encrypted—then the contents of the electronic message are displayed in the vehicle, step 116. The contents of the electronic message can be conveyed to passengers inside of vehicle 12 in a verbatim manner, they can be edited, they can be augmented with other items, etc., so long as the display is representative of the initial electronic message sent from communication device 22. In one embodiment, contents of the electronic message are textually displayed on visual display 38 or some other user interface, while in another embodiment the contents are translated and verbally conveyed to the users through audio system 36 or some other audible means.

It is to be understood that the foregoing is a description of one or more preferred exemplary embodiments of the invention. The invention is not limited to the particular embodiment(s) disclosed herein, but rather is defined solely by the claims below. For example, the particular steps and step sequence described above are for a preferred embodiment and other embodiments, including those having different step sequences, a different number of steps, or different steps, could also be used. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for processing electronic messages sent to a vehicle, comprising the steps of:
   (a) identifying at least one communication device authorized to send electronic messages to the vehicle;
   (b) providing a messaging application to the communication device;
   (c) sending an electronic message from the communication device to a call center, wherein the electronic message is intended for the vehicle but is diverted to the call center by the messaging application; and
   (d) if the communication device is properly authorized to send electronic messages to the vehicle, then forwarding the electronic message from the call center to the vehicle.

2. The processing method of claim 1, wherein step (a) further comprises identifying at least one communication device authorized to send electronic messages to the vehicle by creating an authorized messaging group that is comprised of communication devices enrolled in a pre-selected calling plan.

3. The processing method of claim 1, wherein step (a) further comprises identifying at least one communication device authorized to send electronic messages to the vehicle by creating an authorized messaging group that is comprised of communication devices whose contact numbers are received from an authorized user.

4. The processing method of claim 1, wherein the communication device is a mobile phone and the messaging application is a software program designed to run on a mobile phone.

5. The processing method of claim 1, wherein step (c) further comprises configuring the electronic message according to a message type that is based on a review of a calling plan for the communication device, before sending the electronic message from the communication device to the call center.

6. The processing method of claim 1, wherein step (d) further comprises encrypting contents of the electronic message, before wirelessly forwarding the electronic message from the call center to the vehicle.

7. The processing method of claim 1, further comprising the step of: analyzing the electronic message at the vehicle to determine if it is authentic by determining if it is sent from the call center.

8. The processing method of claim 1, further comprising the step of: analyzing the electronic message at the vehicle to determine if it is authentic by decrypting its contents with a secret key.

9. The processing method of claim 1, further comprising the step of: conveying contents of the electronic message to passengers in the vehicle by displaying them on a visual display located inside of the vehicle.

10. The processing method of claim 1, wherein the electronic message is at least one of a short message service (SMS) message, an instant message, or an email.

11. A method for processing electronic messages sent to a vehicle, comprising the steps of:
   (a) sending an electronic message from a communication device to a call center, wherein the electronic message is intended for the vehicle but is routed to the call center by a messaging application installed on the communication device;
   (b) analyzing the electronic message sent from the communication device to determine if the communication device is properly authorized to send electronic messages to the vehicle;
   (c) if the communication device is properly authorized to send electronic messages to the vehicle, then forwarding the electronic message from the call center to the vehicle; and
   (d) displaying contents of the electronic message to passengers in the vehicle via a visual display.

12. The processing method of claim 11, wherein the method further comprises the step of:
   identifying at least one communication device authorized to send electronic messages to the vehicle by creating an authorized messaging group that is comprised of communication devices enrolled in a pre-selected calling plan, wherein the at least one communication device is identified before sending an electronic message in step (a).

13. The processing method of claim 11, wherein the method further comprises the step of:

identifying at least one communication device authorized to send electronic messages to the vehicle by creating an authorized messaging group that is comprised of communication devices whose contact numbers are received from an authorized user, wherein the at least one communication device is identified before sending an electronic message in step (a).

14. The processing method of claim 11, wherein the communication device is a mobile phone and the messaging application is a software program designed to run on a mobile phone.

15. The processing method of claim 11, wherein step (a) further comprises configuring the electronic message according to a message type that is based on a review of a calling plan for the communication device, before sending the electronic message from the communication device to the call center.

16. The processing method of claim 11, wherein step (c) further comprises encrypting contents of the electronic message, before wirelessly forwarding the electronic message from the call center to the vehicle.

17. The processing method of claim 11, further comprising the step of:

analyzing the electronic message at the vehicle to determine if it is authentic by determining if it is sent from the call center.

18. The processing method of claim 11, further comprising the step of:

analyzing the electronic message at the vehicle to determine if it is authentic by decrypting its contents with a secret key.

19. The processing method of claim 11, wherein the electronic message is at least one of a short message service (SMS) message, an instant message, or an email.

20. A method for processing electronic messages sent to a vehicle, comprising the steps of:

(a) determining an authorized messaging group that includes one or more communication devices authorized to send SMS messages to the vehicle;

(b) providing a messaging application to a communication device in the authorized messaging group;

(c) updating records maintained at a call center with information regarding the authorized messaging group;

(d) diverting a first SMS message from the communication device to the call center, wherein the SMS message is intended for the vehicle and is diverted by the messaging application;

(e) analyzing the first SMS message at the call center to determine if the communication device is part of the authorized messaging group;

(f) if the communication device is part of the authorized messaging group, then wirelessly sending a second SMS message from the call center to the vehicle;

(g) analyzing the second SMS message at the vehicle to determine if it is authentic; and (h) if the second SMS message is authentic, then displaying contents of the second SMS message to passengers in the vehicle.

21. A system for processing electronic messages sent to a vehicle, comprising:

a communication device having text messaging capability such that the communication device receives user inputted text messages and sends the text messages to an addressee selected by the user;

a plurality of vehicles each having a telematics unit that wireless receives text messages; and a call center that communicates wirelessly with the plurality of vehicles via their telematics units;

wherein said communication device includes a messaging application that detects the addressee selected by the user and, if the addressee corresponds to one of the plurality of vehicles, the messaging application redirects the text message to the call center; and wherein the call center receives the redirected text message, attempts to authenticate the redirected text message and, if authenticated, sends the redirected text message to the corresponding vehicle via its telematics unit.

22. A system as set forth in claim 21, wherein the telematics unit of the corresponding vehicle is operable to attempt to authenticate the redirected text message that it receives and, if authenticated, delivers the text message to an occupant in the vehicle.

23. A system as set forth in claim 22, wherein the telematics unit of the corresponding vehicle authenticates the redirected text message by determining if it was sent from the call center.

24. A system as set forth in claim 21, wherein if the addressee does not correspond to one of the plurality of vehicles, the messaging application allows the text message to be sent to the addressee from the communications device without being redirected.

25. A system as set forth in claim 21, wherein the messaging application operates in conjunction with a previously-installed text messaging program and intercepts text messages addressed to the vehicles.

26. A system as set forth in claim 21, wherein the messaging application provides a user interface through which the user can compose the redirected text message.

* * * * *